C. HANKINS.
CAR TRUCK.
APPLICATION FILED AUG. 2, 1916.
1,241,375.
Patented Sept. 25, 1917.
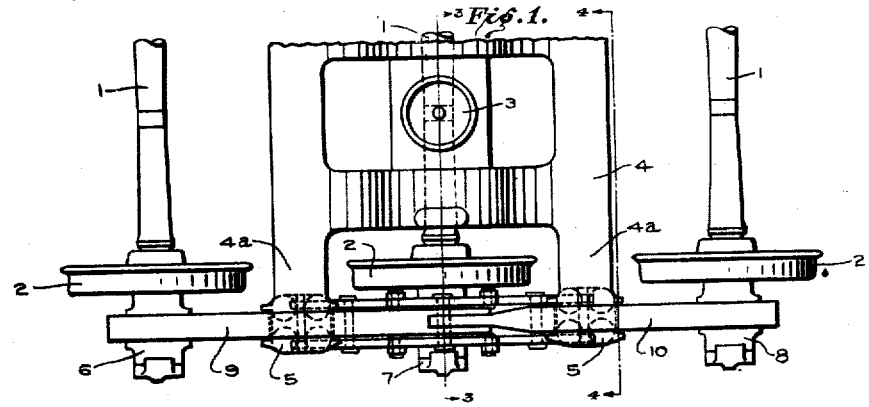
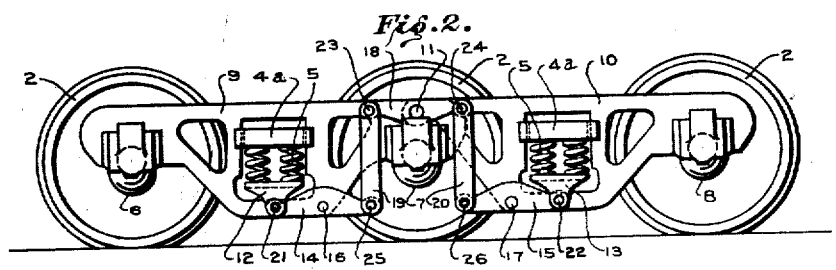
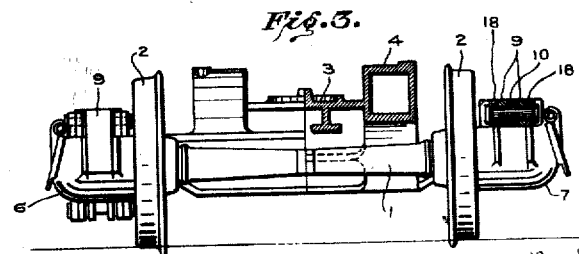
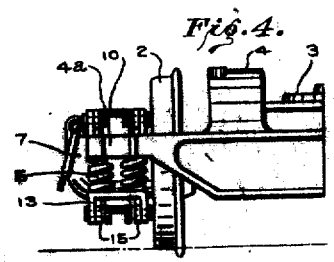
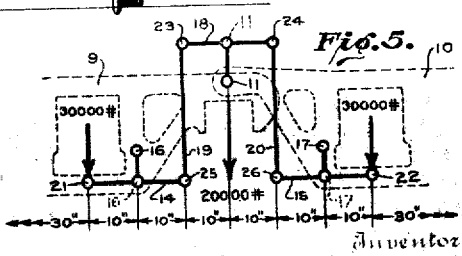
Witness
A. K. Simmons.
J. N. Moseley.
Inventor
Cyrus Hankins
B. W. Kadel.
Attorney

UNITED STATES PATENT OFFICE.

CYRUS HANKINS, OF ROANOKE, VIRGINIA.

CAR-TRUCK.

1,241,375.

Specification of Letters Patent.    Patented Sept. 25, 1917.

Application filed August 2, 1916. Serial No. 112,737.

*To all whom it may concern:*

Be it known that I, CYRUS HANKINS, a citizen of the United States, residing at Roanoke, in the county of Roanoke and State of Virginia, have invented certain new and useful Improvements in Car-Trucks, of which the following is a specification.

This invention relates to car trucks and particularly to those of the six-wheel type, and the principal object thereof is to provide an improved arrangement of elements whereby the load of the car body may be equalized among the several truck wheels. The invention lies in the combination and arrangement of the various parts as will be herein described and as particularly claimed.

In the accompanying drawings, Figure 1 is a broken plan view of a six-wheel truck embodying the features of the present invention. Fig. 2 is a side elevational view of the same. Fig. 3 is a part end elevational view and part transverse vertical sectional view of the same, the left hand portion of the figure being in end elevation and the right hand portion in section, being taken substantially on the line 3—3 of Fig. 1. Fig. 4 is a partial transverse vertical section taken substantially on the line 4—4 of Fig. 1. Fig. 5 is a simplified diagram representing in side elevational view the arrangement of the equalizing levers.

Referring now to embodiment shown in the drawings, the truck is provided with axles 1 and wheels 2 mounted thereon. In a six-wheel truck as shown there are as usual, three axles with two wheels per axle. This form of construction is well-known in the art; hence in Fig. 1 the wheels along one side of the truck are omitted as well as the other parts making up the side structure. The load from the car body is carried on a load-receiving center plate 3 supported upon a load-carrying bolster 4. This bolster is provided with two arms 4ª at each side of the truck, each of which serves to deliver a portion of the bolster load to the side frame construction, these arms being supported directly upon the springs 5.

As both sides of the truck will be provided with duplicate parts but one side will be described. And it will be understood that in the embodiment shown the two sides of the truck are constructed in an identical manner.

Each of the axles has the customary oil boxes mounted upon the ends of the same, these oil boxes containing the journal bearings and serving as means for applying the load to the axles. The oil box 6 is one of those supplied for an end axle, the oil box 7 one for the middle axle, and the oil box 8 one of those for the other end axle. The side frames, which tie the oil boxes together, are made in two sections, 9 and 10, these being pivoted together at 11 for articulation with respect to a horizontal plane. The oil boxes 6 and 7 are secured rigidly to the outer and inner ends respectively of the portion 9 which may be termed a rigid side frame and the oil box 8 is rigidly secured to the outer end of the section 10, which may be termed an articulated side frame. The frame portion 9 is supported at its respective ends upon the boxes 6 and 7 and the section 10 is supported at its outer end upon the box 8 and at its inner end upon the box 7, the load being transferred through the inner end of the portion 9 in the present embodiment.

Seats 12 and 13 are shown for the springs 5. These seats do not rest directly upon the frame sections 9 and 10 but are supported upon the outer extremities 21 and 22 of levers 14 and 15, these levers in turn being pivoted to the side frame sections 9 and 10 respectively between the extremities of the levers 14 and 15 at 16 and 17. A third lever 18 is provided for each side of such a truck and this lever is positioned on line with the middle oil box 7. The inner ends 25 and 26 of the levers 14 and 15 react upwardly through the links 19 and 20 against the extremities 23 and 24 of the lever 18. Thus an upward force or lifting tendency is exerted upon the oil box 7 through the inner ends of the frame sections 9 and 10 to which the lever 18 is pivoted at the frame hinge point 11.

In the embodiment shown the spring seats 12 and 13 are shown bifurcated so as to straddle the frames 9 and 10 and the levers 14 and 15 are made in two parts, one part extending longitudinally along each side of the side frame. The lever 18 and the links 19 and 20 are similarly made in two parts for convenience.

The truck features described are unique and possess many points of advantage in truck construction. For while the superimposed load of the car body is applied to the side frames of the truck at locations and in such manner as tend to produce unequal wheel and oil box loadings, yet a correction is made by means of the levers whereby the loads are perfectly equalized. The loads are in reality applied to the frame sections as downward forces at 16 and 17 in excess of the loads applied to the ends 21 and 22 of the levers 14 and 15. These excessive downward forces tend to overload the middle wheels, oil boxes, etc. But the inner ends of the levers 14 and 15 exert an upward force upon the lever 18 and it in turn upon the side frames whereby the overloading tendency is counteracted, the magnitude of the upward force being enough to equalize the excess of the downward force.

In order that this may be readily understood I have inserted in Fig. 5 certain typical dimensions in accordance with which the parts might be proportioned and have shown the direction and magnitude of certain of the forces. This truck is taken as with a total wheel base of 10 ft., or with a distance of 60 inches from the center of one pair of wheels to the center of the next pair. The bolster arms and springs 5 apply their loads to the ends 21 and 22 of the levers 14 and 15 at points midway between the wheels. Thus there is a distance of 30 inches from these points to the center line of the adjacent wheels. The levers 14 and 15 being 20 inches in length and the fulcrum points being central therewith, the downward forces applied to the frame sections at 16 and 17 are equal to twice the force applied at 21 and 22 or for the forces of 30,000 lbs. These downward forces are equal to 60,000 lbs. each. And the upward forces in the links 19 and 20 are under these given conditions equal to 30,000 lbs. each, giving an upward force at 11 of 60,000 lbs. The primary forces of 60,000 lbs. applied to the frame sections at 16 and 17 will each be divided between the end and middle oil boxes in the ratio of 20,000 lbs. and 40,000 lbs. respectively, so that these two downward forces will tend to give downward loads of 20,000 lbs. to each end oil box and 80,000 lbs. to the middle oil box. But the upward force applied to the middle oil box and heretofore traced out is equal to 60,000 lbs. So that the resultant of the two forces is 20,000 lbs. in a downward direction, or the correct force for equalization.

It is immaterial whether the lever 18 is attached directly to the ends of the frame sections as shown or not as it may deliver its upward force to any point where the same will subtract from the excess downward force. It is necessary, however, with the levers 14 and 15, that they each react at 25 or 26 against some portion of the truck other than the side frame section to which the same is pivoted, and preferably against a member such as the lever 18 which is capable of swiveling as at 11.

The bolster 4 is of platform construction, and as previously stated has four arms or load delivering seats. And when used in connection with my system of equalizers along each side of the truck I have provided a truck with a load carrying bolster supported at four points wherein the reactions at all four points will be equal at all times. For if in the process of manufacture one bolster arm should be warped out of the common plane the levers will assume angles at which equalization of loads and reactions will result.

I have thus described an embodiment of my invention. It will be evident that alterations and various embodiments thereof are possible, within the scope of the appended claims, without departing from the spirit thereof.

What I claim is:

1. In a car truck, a plurality of wheels, axles and oil boxes, a load-carrying frame extending between adjacent oil boxes and supported thereby, means for imparting the superimposed load of the car body to the said frame in such manner as will tend to produce unequal oil box loadings, and means connected therewith for exerting an upward influence upon the said frame in such manner, at such a point, and of sufficient moment as to correct the said tendency to unequal loading.

2. In a car truck, a plurality of wheels, axles and oil boxes, side frames extending between adjacent oil boxes and supported thereby, means for imparting the superimposed load of the car body to the side frames, said means being so arranged as to deliver primary forces to the side frames in excess of the superimposed loads and in such locations as to tend to overload one of the oil boxes, said means being further adapted to exert an upward force at the overloaded oil box of such magnitude as to produce a final resultant downward force equal to that on the other oil boxes, and means for receiving the load from the car body and delivering it to the said load imparting means.

3. In a car truck, a plurality of wheels, axles and oil boxes, frames extending between adjacent oil boxes adapted to tie the same together and to impart loads thereto, means for imparting loads to the said frames, said means being so arranged as to deliver loads to the frames in excess of the superimposed loads and in such locations as to tend to overload one of the oil boxes, the said load imparting means being further adapted to exert a corrective force to the said frames which will counteract the tendency to overload the said oil box, and means for receiving the load from the car body and delivering it to the said load imparting means.

4. In a car truck, a plurality of wheels and axles with oil boxes on the ends thereof, a jointed, sectional, side frame disposed along each side of the truck and supported upon the said oil boxes, a truck bolster having means thereon for receiving the load from the car body and supporting the same, means for transferring the load from said bolster to the oil boxes, said means embodying levers pivoted between their extremities to the said frames and each carrying at its one end a seat for supporting the said bolster, the opposite end of each of said levers reacting against a portion of the truck other than the portion of the side frame to which it is pivoted.

5. In a six-wheel car truck, a plurality of wheels and axles with oil boxes on the ends thereof, a rigid and an articulated side frame along each side of the truck, the same being coupled together at their inner ends and the oil boxes for an end and for the middle axle being secured to the rigid side frame, the oil box for the other outer axle being secured to the articulated side frame, a lever pivoted between its extremities to each of said side frames, a bolster having means for receiving the load from the car body, seats on the one end of each of said levers for supporting the said bolster, the other end of the levers at each side of the truck being provided with means for transferring their upward reactions to a member other than the side frame to which that lever is pivoted.

6. In a six-wheel car truck, three axles with wheels mounted thereon and with the customary oil boxes, a two-part side member along each side of the truck, the two sections thereof being articulated with respect to each other in and out of a horizontal plane, one of said sections carrying oil boxes for an end and for the middle axle and being supported thereon, the other section carrying an oil box for the other end axle and being supported thereby at its outer end, the inner end being supported by the middle oil box, two levers which receive load at their outer extremities and one of which is pivoted between its extremities to each side member section, a third lever extending between the inner ends of the first two said levers and receiving an upward load therefrom, said third lever reacting between its extremities against the inner ends of the side members in such manner as to exert an upward force thereto, and there being means in connection with the said truck for receiving load from the car body and imparting it to the outer ends of the first two of the said levers.

7. In a car truck, a plurality of wheels, axles and oil boxes, side frames disposed along either side of the truck and supported by the said oil boxes and rigidly secured thereto, a truck bolster of platform construction having a load receiving seat thereon and having at least four fixed load delivering seats, a system of levers supporting the said bolster and transferring the load therefrom to the said side frames, the said levers being so coupled together as to at all times produce equal reactions among all of the load delivering seats of the said bolster.

8. In a six-wheel car truck, three axles with wheels mounted thereon and with the customary oil boxes, a two-part side member along each side of the truck, the two sections thereof being articulated relative to each other with respect to a horizontal plane, one of said sections carrying oil boxes for an end and for the middle axle and being supported thereon, the other end section carrying an oil box for the other end axle and being supported thereby at its outer end, the inner end being supported by the middle oil box, two levers at each side of the truck, one being pivotally supported upon each side frame section, each of the levers being provided with a load receiving seat, and a third lever at each side of the truck, the same supporting the adjacent ends of the first two said levers and reacting in an upward direction against the inner ends of the side frame sections, together with means for receiving the load from the car body and delivering the same to the first two of the said levers on each side of the truck.

9. In a six-wheel car truck, three axles with wheels mounted thereon, and with the customary oil boxes, a two-part side frame along each side of the truck, the two sections thereof being articulated with respect to each other about a transverse, horizontal axis, one of said sections carrying the oil boxes for an end and for the middle axle and being supported thereon, the other section carrying an oil box for the other end axle and being supported thereby at its outer end, the inner end being supported by the middle oil box, a truck bolster of platform construction having a load-receiving seat thereon and having four fixed load-delivering seats, a system of levers along each side of the truck supporting the said bolster and transferring the load therefrom to the said side frame sections, each of said lever systems including a lever fulcrumed between its extremities to each side frame, each of said levers having a load-receiving seat at its one extremity adapted to coöperate with a load-delivering seat on the said bolster, and an intermediate lever supporting the other ends of the first two said levers, the same being pivoted on line with the middle oil box and reacting against the inner ends of the side frame sections, all of said levers along one side of the truck being pivotally coupled together in such manner as to equalize the reactions between the load-receiving points at that side of the truck.

In testimony whereof I affix my signature in presence of a witness.

CYRUS HANKINS.

Witness:
A. K. SIMMONS.